United States Patent
Sharp et al.

(10) Patent No.: US 9,134,954 B2
(45) Date of Patent: Sep. 15, 2015

(54) GPU MEMORY BUFFER PRE-FETCH AND PRE-BACK SIGNALING TO AVOID PAGE-FAULT

(75) Inventors: Colin Christopher Sharp, San Diego, CA (US); David Rigel Garcia Garcia, Toronto (CA); Eduardus A. Metz, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/608,546

(22) Filed: Sep. 10, 2012

(65) Prior Publication Data

US 2014/0075060 A1    Mar. 13, 2014

(51) Int. Cl.
*G06F 3/00* (2006.01)
*G06F 5/14* (2006.01)
*G06T 1/60* (2006.01)

(52) U.S. Cl.
CPC .... *G06F 5/14* (2013.01); *G06T 1/60* (2013.01)

(58) Field of Classification Search
CPC .................................. G06F 5/14; G06T 1/60
See application file for complete search history.

(56) References Cited

U.S. PATENT DOCUMENTS

| | | | | |
|---|---|---|---|---|
| 4,779,191 A * | 10/1988 | Greenblatt | ......................... | 711/2 |
| 5,063,499 A * | 11/1991 | Garber | ............................. | 703/27 |
| 5,699,539 A * | 12/1997 | Garber et al. | ..................... | 711/2 |
| 5,937,437 A * | 8/1999 | Roth et al. | ..................... | 711/202 |
| 6,038,631 A * | 3/2000 | Suzuki et al. | ................. | 710/260 |
| 6,047,363 A | 4/2000 | Lewchuk | | |
| 6,381,672 B1 | 4/2002 | Strongin et al. | | |
| 6,834,328 B2 * | 12/2004 | Dwarkadas et al. | .......... | 711/128 |
| 6,889,296 B2 * | 5/2005 | Franaszek et al. | ............ | 711/156 |
| 7,089,370 B2 | 8/2006 | Luick | | |
| 7,117,337 B2 * | 10/2006 | Chiang et al. | ................. | 711/206 |
| 7,278,008 B1 * | 10/2007 | Case et al. | ..................... | 711/209 |
| 7,363,463 B2 * | 4/2008 | Sheu et al. | ..................... | 711/203 |
| 7,552,303 B2 * | 6/2009 | Dunshea et al. | ............. | 711/170 |
| 7,623,134 B1 | 11/2009 | Danilak | | |
| 7,921,276 B2 * | 4/2011 | Illikkal et al. | ................. | 711/207 |
| 8,024,547 B2 | 9/2011 | Lee et al. | | |
| 8,035,648 B1 | 10/2011 | Wloka et al. | | |
| 8,108,641 B2 * | 1/2012 | Goss et al. | ..................... | 711/163 |
| 8,464,023 B2 * | 6/2013 | Devendran et al. | ........... | 711/206 |
| 2005/0071571 A1 | 3/2005 | Luick | | |
| 2008/0276067 A1 | 11/2008 | Chen et al. | | |
| 2009/0119477 A1 * | 5/2009 | Plondke et al. | ............... | 711/207 |
| 2013/0007406 A1 * | 1/2013 | Sheaffer et al. | ............... | 711/207 |
| 2013/0019080 A1 * | 1/2013 | Levinsky et al. | ............. | 711/206 |
| 2013/0159662 A1 * | 6/2013 | Iyigun et al. | ................... | 711/206 |

OTHER PUBLICATIONS

Chen T-F et al., "Effective Hardware-Based Data Prefetching for High-Performance Processors", IEEE Transactions on Computers, IEEE Service Center, Los Alamitos, CA, US, vol. 44, No. 5, May 1, 1995. pp. 609-623, XP000525553.

(Continued)

*Primary Examiner* — Jing-Yih Shyu
(74) *Attorney, Agent, or Firm* — Shumaker & Sieffert, P.A.

(57) ABSTRACT

This disclosure proposes techniques for demand paging for an IO device (e.g., a GPU) that utilize pre-fetch and pre-back notification event signaling to reduce latency associated with demand paging. Page faults are limited by performing the demand paging operations prior to the IO device actually requesting unbacked memory.

32 Claims, 8 Drawing Sheets

(56) References Cited

OTHER PUBLICATIONS

Dahlgren F et al., "Sequential Hardware Prefetching in Shared-Memory Multiprocessors", IEEE Transactions on Parallel and Distributed Systems, IEEE Service Center, Los Alamitos, CA, US, vol. 6, No. 7, Jul. 1, 1995, pp. 733-746, XP000589484.

Grimsrud K S et al., "Multiple Prefetch Adaptive Disk Caching", IEEE Transactions on Knowledge and Data Engineering, vol. 5, No. 1, Feb. 1993, pp. 88-103, XP002712303.

International Search Report and Written Opinion—PCT/US2013/053925—ISA/EPO—Sep. 17, 2013, 11 pp.

Radatz, "The IEEE Standard Dictionary of Electrical and Electronics Terms", 1996, Institute of Electrical and Electronics Engineers, XP002712302, ISBN: 1-55937-833-6, pp. 524, 525, 733.

Smith A J "Cache Memories", ACM Transactions on Database Systems, ACM, New York, NY, US, vol. 14, No. 3, Sep. 1, 1982, pp. 473-530, XP000284855.

Vanderwiel S P. et al., "Data Prefetch Mechanisms", ACM Computing Surveys, ACM, New York, US, vol. 32, No. 2, Jun. 1, 2000, pp. 174-199, XP002977351.

Vanderwiel S P. et al., "When Caches Aren't Enough: Data Prefetching Techniques", Computer, IEEE Service Center, Los Alamitos, CA, US, vol. 30, No. 7, Jul. 1, 1997, pp. 23-30, XP000730817.

International Preliminary Report on Patentability from International Application No. PCT/US2013/053925, dated Jan. 7, 2015, 9 pp.

Fatahalian et al., "GPU's a closer look," Tomorrow's Computing Today, Association for Computing Machinery, Mar. 1, 2008, pp. 18-28.

"The IEEE Standard Dictionary of Electrical and Electronics Terms," 1996, IEEE; ISBN: 1-55937-833-6, pp. 143.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

International Preliminary Report on Patentability from International Application No. PCT/US2013/022138, dated May 13, 2014, 7 pp.

Response to Second Written Opinion dated Mar. 22, 2013, from International Application No. PCT/US2013/022138, filed on Nov. 18, 2013, 38 pp.

\* cited by examiner

GPU MEMORY BUFFER PRE-FETCH AND PRE-BACK SIGNALING TO AVOID PAGE-FAULT

TECHNICAL FIELD

This disclosure relates to techniques for graphics processing, and more specifically to techniques for pre-fetch and pre-back signaling from a graphics processing unit (GPU) to avoid page faults in a virtual memory system.

BACKGROUND

Visual content for display, such as content for graphical user interfaces and video games, may be generated by a graphics processing unit (GPU). A GPU may convert two-dimensional or three-dimensional (3D) objects into a two-dimensional (2D) pixel representation that may be displayed. In addition, GPUs are being increasingly used to perform certain types of computations that are more efficiently handled by the highly parallel nature of GPU cores. Such applications are sometimes called general-purpose GPU (GPGPU) applications. Converting information about 3D objects into a bit map that can be displayed, as well as large GPGPU applications, requires considerable memory and processing power. Often, inefficiencies in GPU processing may occur during memory access, as there is a lack of techniques for stopping and resuming the highly parallel jobs executing on a GPU. As such, complex and expensive memory controllers, as well as central processing unit (CPU) oversight is used to improve memory access efficiency.

SUMMARY

In general, this disclosure describes techniques for pre-fetch and pre-back signaling from a graphics processing unit (GPU) to avoid page faults in a virtual memory system.

In one example of the disclosure, a method for demand paging in an input/output device includes tracking, by the input/output device, a usage of a first portion of mapped pages in a virtual memory system by an application executing on the input/output device, wherein the first portion of mapped pages represent a portion of a number of pages that may be needed by the application, and wherein the first portion of mapped pages are backed into physical memory. The input/output device may be further configured to determine if the usage crosses a threshold, and, in the case that the threshold is determined to be crossed, signal a processor to back a second portion of pages in physical memory, wherein the second portion of pages represents a different portion of the number of pages that may be needed by the application.

In one example of the above technique the threshold is a watermark representing a percentage of usage of the first portion of mapped pages, and at least the first portion of mapped pages are stored in a buffer. In this case, the watermark is a location within the buffer. The input/output device determines if the usage crosses the threshold by determining, if a current location accessed in the buffer by the input/output device is past the watermark.

In another example of the disclosure, a method for demand paging in an input/output device includes tracking, by the input/output device, a usage of a first portion of mapped pages in a virtual memory system by an application executing on the input/output device, wherein the first portion of mapped pages represent a portion of a number of pages that may be needed by the application, and wherein page table entries for the first portion of mapped pages are stored in a memory management unit. The input/output device may be further configured to determine if the usage crosses a threshold, and, in the case that the threshold is determined to be crossed, signal a processor to fetch page table entries for a second portion of mapped pages, wherein the second portion of pages represents a different portion of the number of pages that may be needed by the application.

In one example of the above technique, the threshold is a watermark representing a percentage of usage of the first portion of mapped pages. More specifically, the watermark may be location within a last page of the first portion of mapped pages. In this case, the input/output device determines if the usage crosses the threshold by determining if a current location accessed in the last page by the input/output device is past the watermark.

The techniques of this disclosure are also described in terms of an apparatus and a computer-readable storage medium storing instructions for causing a processor to perform the techniques. The details of one or more examples are set forth in the accompanying drawings and the description below. Other features, objects, and advantages will be apparent from the description and drawings, and from the claims.

DETAILED DESCRIPTION

Figure 1:
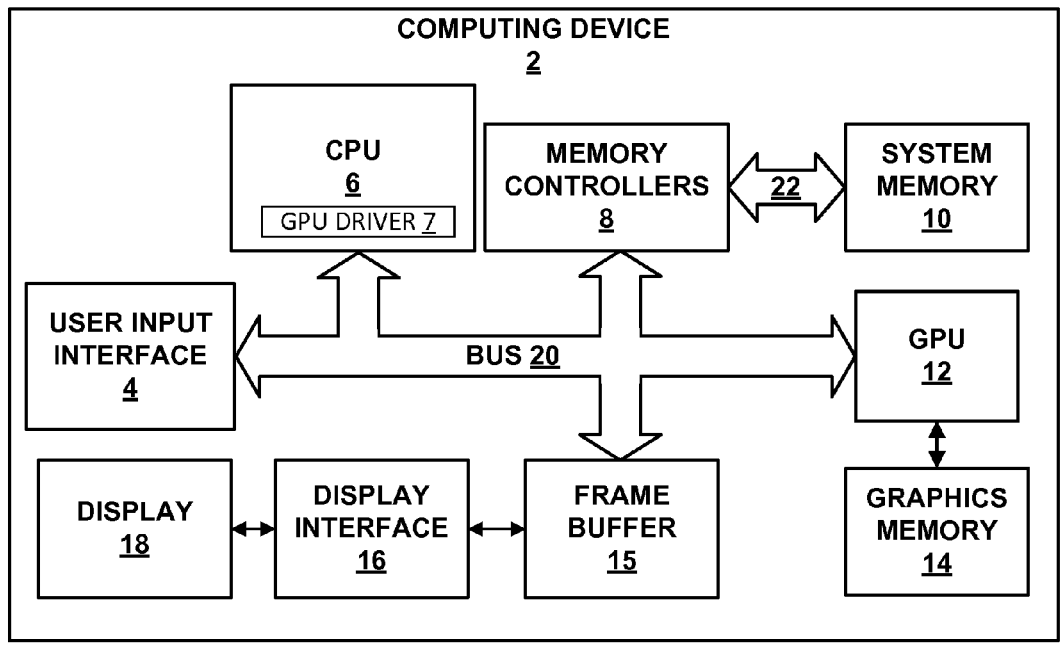
FIG. 1 is a block diagram showing an example computing device configured to use the techniques of this disclosure.

This disclosure relates to techniques for graphics processing, and more specifically to techniques for pre-fetch and pre-back signaling from a graphics processing unit to avoid page faults in a virtual memory system.

Modern operating systems (OS) that run on central processing units (CPU) typically use a virtual memory scheme for allocating memory to multiple programs operating on the CPU. Virtual memory is a memory management technique that virtualizes a computer system's physical memory (e.g., RAM, disk storage, etc.) so that an application need only refer to one set of memory (i.e., the virtual memory). Virtual memory consists of contiguous address spaces that are mapped to locations in physical memory. In this way, the fragmentation of physical memory is "hidden" from the applications, which instead may interact with contiguous blocks of virtual memory. The contiguous bocks in virtual memory are typically arranged into "pages." Each page is some fixed length of contiguous blocks of virtual memory addresses. Mapping from the virtual memory to the physical memory is often handled by a memory management unit (MMU). Virtual memory space that is currently mapped to locations in physical memory is considered to be "backed" to physical memory.

The mapping of locations in virtual memory space to physical memory is stored with a translation lookaside buffer (TLB). The TLB is used by the MMU to quickly translate virtual addresses to physical addresses. The TLB may be implemented as a content-addressable memory (CAM) that uses a virtual memory address as an input and outputs a physical memory address. The MMU may then quickly retrieve the requested data using the output physical memory address Some applications may use a large amount of memory during execution. However, the amount of memory that may be used by the application may not be needed at the same time. Instead of mapping all the pages into virtual memory that might be needed by a program, pages may only be mapped for the memory that is actually currently being requested by the program. Additional pages of virtual memory are mapped if and when the program requests data that has not previously been mapped. This is called demand paging or demand memory backing. If a program requests data that has not been mapped, a page fault is triggered. In response to a page fault, an MMU may then map the physical memory locations being requested. Responding to page faults generally slows down the response time of a virtual memory system.

Reductions in the response time of a virtual memory system may also be caused by a TLB miss. A TLB miss occurs when data is requested from a backed page, but the actual mapping for the virtual memory addresses in the page are not currently stored in the TLB. In many circumstances, the TLB may not store all page mappings, even if the page had been previously backed. When a TLB miss occurs, the MMU accesses the desired mappings and stores them in the TLB.

Modern graphics processing units (GPUs) have page faulting capabilities similar to CPUs, allowing memory allocations to not be present at GPU access time. However, the latency to handle a page fault in a GPU, relative to the computational power of GPU, makes demand fill page faulting undesirable. The latency may be noticeable to a user, thus creating an unsatisfactory user experience. This can be particularly problematic for GPU systems that cannot effectively reschedule work to cover the latency involved in paging from memory.

Historically, input/output (IO) devices, such as a graphical processing unit (GPU), have required any memory buffers accessed by such devices to be backed in entirety into physical memory and mapped into an IO memory management unit (IOMMU) virtual memory space prior to launching a job against those buffers. In this context, a buffer is a region of a physical memory storage used to temporarily hold data. When used with a virtual memory system, buffers are implemented virtually in software as pointers to locations in physical memory. In this way, the virtual software buffer is "backed" in physical memory.

As buffer sizes grow, it has become desirable to move to a demand paging model as occurs in most modern central processing units CPU/OS's. In this scenario, a page fault is triggered within the IOMMU when the IO device attempts to access memory that is not currently backed (and mapped) into physical memory representing a portion of the buffer. When the page fault occurs, the IO device halts processing of the faulting job and either switches to another job, or, halts until the fault handling is complete. When the fault occurs, the host CPU is typically signaled via an interrupt from the IO subsystem (e.g., the IOMMU) indicating a fault. The OS determines, in this case, that the fault is a demand page fault and moves some amount of the buffer in question from backing store into physical memory and maps it into the IOMMU. Then, the OS signals to the IO subsystem that the backing has occurred, allowing the faulting IO job to continue.

Demand paging is a valuable technique to fill memory at utilization time. However, the performance cost of a demand page fault can be extremely high, particularly if the IO device (e.g., a GPU) is incapable of scheduling other work during the fault handling. The fault handling is a long path, including IO subsystem to CPU interrupt handling, and then to disk access for backing store retrieval. It is thus highly desirable to avoid page faults where possible.

In view of these drawbacks, this disclosure proposes techniques for demand paging, for an IO device (e.g., a GPU), that utilize pre-fetch and pre-back notification event signaling to reduce latency associated with demand paging. According to one example of this disclosure, page faults are limited by performing the demand paging operations prior to the IO device actually requesting unbacked memory. If the IO device is able to "look ahead" during current processing, while still working in mapped memory, the IO device can anticipate a future page fault and can send a pre-back signal to the host CPU OS/driver to request a backing of memory that will be accessed in the future. If the signaling occurs early enough to hide the latency of the page backing, the memory will be backed prior to the IO device accessing that memory, and thus avoiding the page fault.

In one example of the disclosure, a method for demand paging in an input/output device includes tracking, by the input/output device, a usage of a first portion of mapped pages in a virtual memory system by an application executing on the input/output device, wherein the first portion of mapped pages represent a portion of a number of pages that may be needed by the application, and wherein the first portion of mapped pages are backed into physical memory. The input/output device may be further configured to determine if the usage crosses a threshold, and, in the case that the threshold is determined to be crossed, signal a processor to back a second portion of pages in physical memory, wherein the second portion of pages represents a different portion of the number of pages that may be needed by the application.

In another example of the disclosure, a method for demand paging in an input/output device includes tracking, by the input/output device, a usage of a first portion of mapped pages in a virtual memory system by an application executing on the input/output device, wherein the first portion of mapped pages represent a portion of a number of pages that may be needed by the application, and wherein page table entries for the first portion of mapped pages are stored in a memory management unit. The input/output device may be further configured to determine if the usage crosses a threshold, and, in the case that the threshold is determined to be crossed, signal a processor to fetch page table entries for a second portion of mapped pages, wherein the second portion of pages represents a different portion of the number of pages that may be needed by the application.

FIG. 1 is a block diagram illustrating an example computing device 2 that may be used to implement the techniques of this disclosure for demand paging in an IO device. Computing device 2 may comprise, for example, a personal computer, a desktop computer, a laptop computer, a tablet computer, a computer workstation, a video game platform or console, a mobile telephone such as, e.g., a cellular or satellite telephone, a landline telephone, an Internet telephone, a so-called smartphone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

As illustrated in the example of FIG. 1, computing device 2 may include a user input interface 4, a central processing unit (CPU) 6, one or more memory controllers 8, a system memory 10, a graphics processing unit (GPU) 12, a graphics memory 14, a display interface 16, a display 18 and buses 20 and 22. Note that in some examples, graphics memory 14 may be "on-chip" with GPU 12. In some cases, all hardware elements show in FIG. 1 may be on-chip, for example, in a system on a chip (SoC) design. User input interface 4, CPU 6, memory controllers 8, GPU 12 and display interface 16 may communicate with each other using bus 20. Memory controllers 8 and system memory 10 may also communicate with each other using bus 22. Buses 20, 22 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute a GPU driver 7 for controlling the operation of GPU 12. The user may provide input to computing device 2 via one or more input devices (not shown) such as a keyboard, a mouse, a microphone, a touch pad, a touch screen, or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, an Open Computing Language (OpenCL®) API, a Direct3D API, an X3D API, a RenderMan API, a WebGL API or any other public or proprietary standard graphics API. In order to process the graphics rendering instructions, CPU 6 may issue one or more graphics rendering commands to GPU 12 (e.g., through GPU driver 7) to cause GPU 12 to perform some or all of the rendering of the graphics data. In some examples, the graphics data to be rendered may include a list of graphics primitives, e.g., points, lines, triangles, quadrilaterals, triangle strips, etc.

Memory controllers 8 facilitate the transfer of data going into and out of system memory 10. For example, memory controllers 8 may receive memory read and write commands, and service such commands with respect to system memory 10 in order to provide memory services for the components in computing device 2. Memory controllers 8 are communicatively coupled to system memory 10 via memory bus 22. Although memory controllers 8 are illustrated in FIG. 1 as being a processing module that is separate from both CPU 6 and system memory 10, in other examples, some or all of the functionality of memory controller 8 may be implemented on one or both of CPU 6 and system memory 10.

Memory controllers 8 may also include one or more memory management units (MMUSs), including an IOMMU for controlling IO device access (e.g., a GPU) to system memory 10. The memory management units may implement a virtual memory system. The virtual memory space may be divided into a plurality of virtual pages. These virtual pages may be contiguous, but the physical pages in system memory 10 to which these virtual pages correspond may not be contiguous in system memory 10. Pages may be considered as the minimum units that an MMU may be able to manage.

Figure 2:
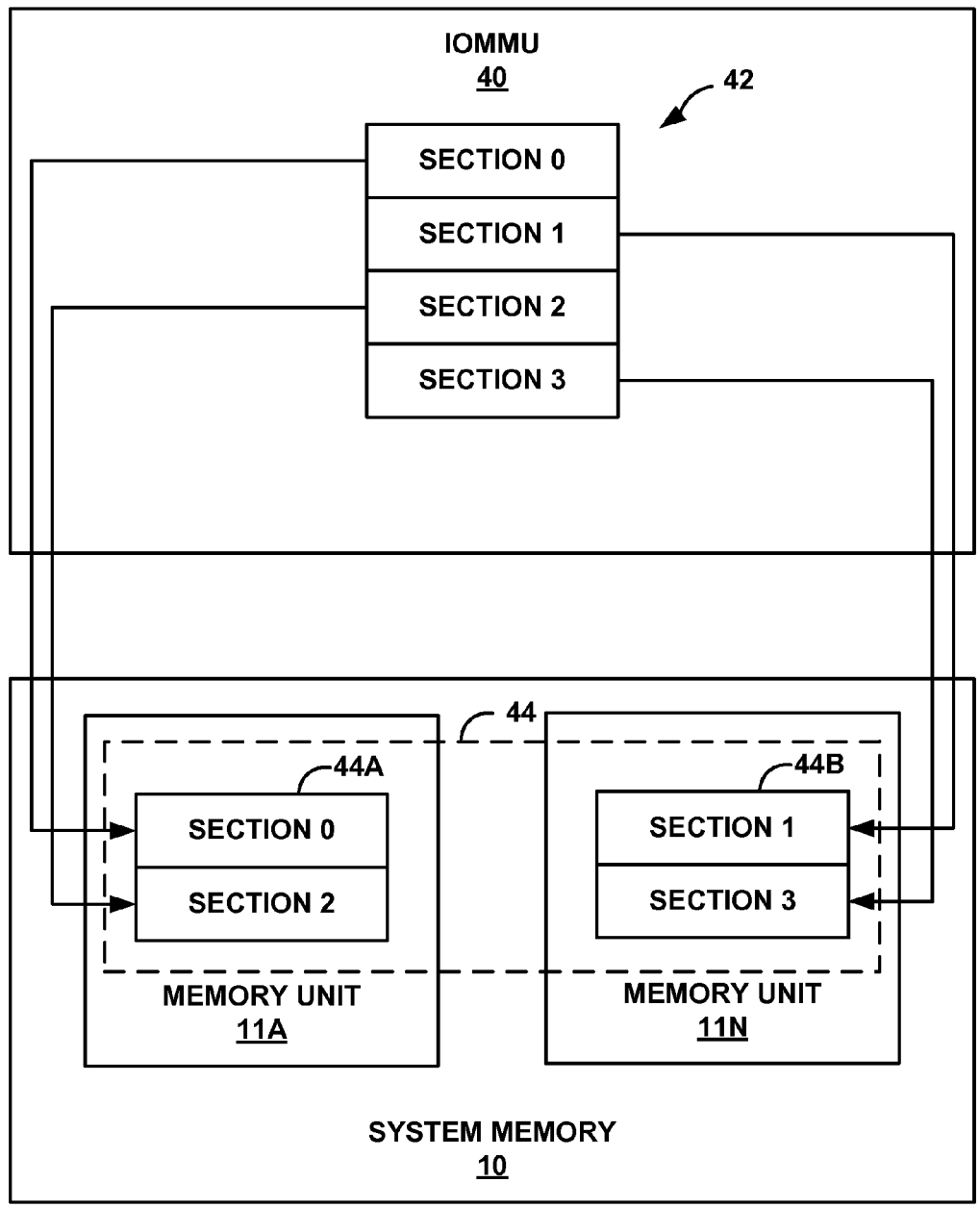
FIG. 2 is a conceptual diagram illustrating an example physical page of a system memory of FIG. 1.

FIG. 2 is a conceptual diagram illustrating an example physical page of system memory 10. For example, FIG. 2 illustrates an IOMMU 40 including a virtual page 42 which includes four sections (sections 0-3). It should be understood that virtual page 42 is a virtual construct that is illustrated in FIG. 2 for ease of understanding. In FIG. 2, system memory 10 may include a physical page 44 that corresponds to virtual page 42.

Physical page 42 may be stored across multiple memory units of system memory 10. For example, physical page 42 may encompass both memory unit 11A and memory unit 11N. For example, memory unit 11A may store a portion of physical page 44, indicated as portion 44A, and memory unit 11N may store a portion of physical page 44, indicated as portion 44B. As illustrated, memory unit 11A stores section 0 and section 2 of physical page 44, and memory unit 11N stores section 1 and section 3 of physical page 44.

Memory unit 11A may store section 0 and section 2, and memory unit 11N may store section 1 and section 3 because of IOMMU 40 storing data in an interleaving manner. When data is stored in an interleaving manner, one portion of data is stored in a first memory unit and then a second portion of data is stored in a second memory unit before further data is stored in the first memory unit. This example only includes two memory units, but any number of memory units may be used. For instance, referring back to FIG. 1, GPU driver 7 may transmit instructions that cause GPU 12 to store pixel values or any other computed value, and may transmit the virtual addresses for where the pixel value are to be stored. GPU 12, in turn, may request IOMMU 40 to store the pixel values in accordance with the virtual addresses. IOMMU 40, in turn, may map the virtual addresses to physical addresses and store the pixel values in pages of system memory 10 in an interleaving manner based on the physical addresses.

IOMMU 40 may be configured to store the pixel values in an interleaving manner. As one example, IOMMU 40 may be pre-programmed to store the pixel values in the interleaving manner. As another example, IOMMU 40 may receive instructions that instruct IOMMU 40 to store the pixel values in the interleaving manner.

System memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 18. In addition, system memory 10 may store user applications and application surface data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store other graphics data such as any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to graphics memory 14. Thus, GPU 12 may read data from and write data to graphics memory 14 without using bus 20. In other words, GPU 12 may process data locally using a local storage, instead of using other, slower system memory. This allows GPU 12 to operate in a more efficient manner by eliminating the need of GPU 12 to read and write data via system bus 20, which may experience heavy bus traffic. In some instances, however, GPU 12 may not include a separate memory, but instead utilize system memory 10 via bus 20. Graphics memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer 15. Typically, frame buffer 15 would be allocated within system memory 10, but may in some circumstances be an independent memory. Display interface 16 may retrieve the data from frame buffer 15 and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone. Alternatively, display 18 may be a stand-alone device coupled to computer device 2 via a wired or wireless communications link. For instance, display 18 may be a computer monitor or flat panel display connected to a personal computer via a cable or wireless link.

Figure 3:
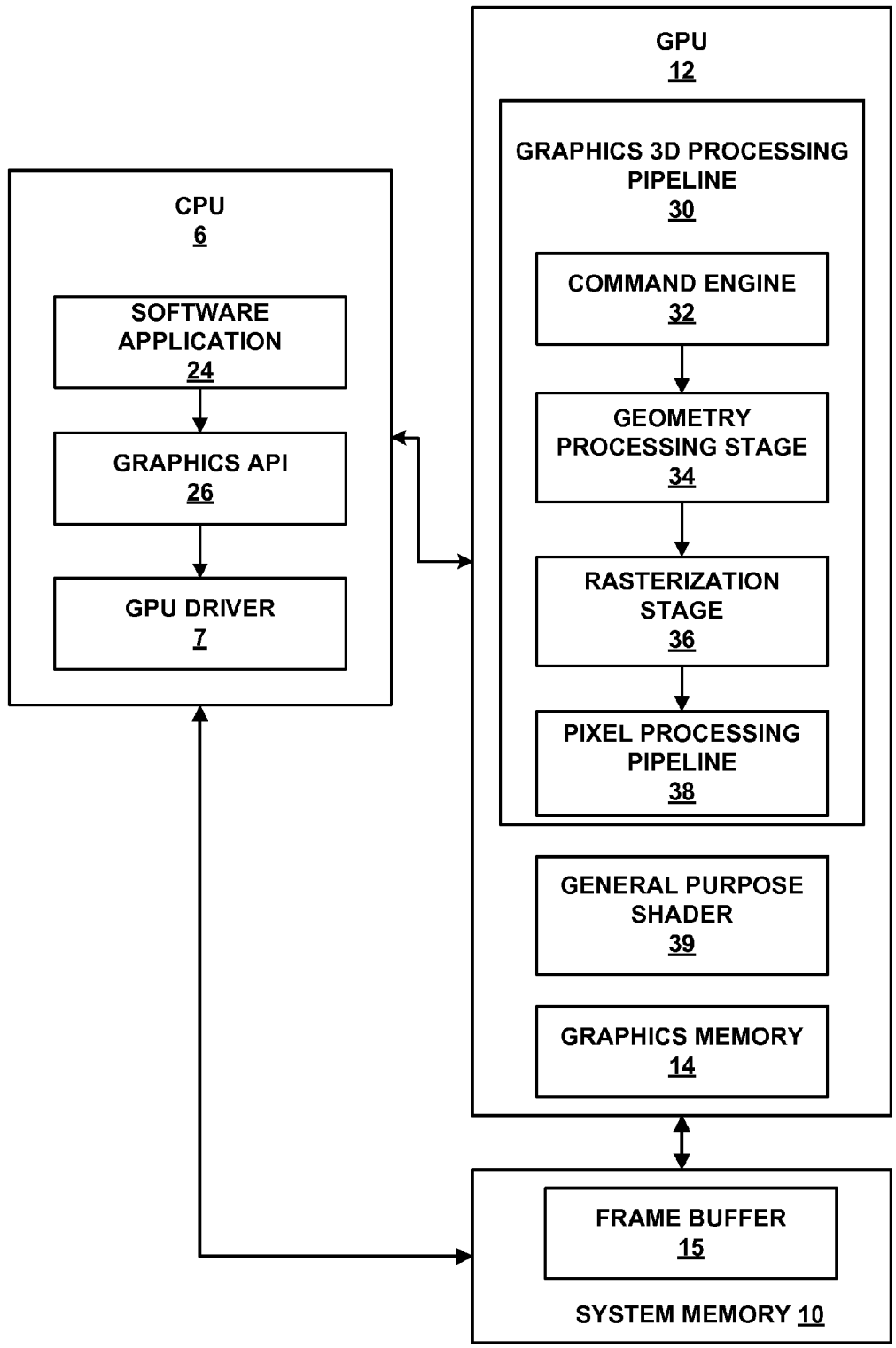
FIG. 3 is a block diagram showing example processing units configured to use the techniques of this disclosure.

FIG. 3 is a block diagram illustrating example implementations of CPU 6, GPU 12, and system memory 10 of FIG. 1 in further detail. CPU 6 may include at least one software application 24, a graphics API 26, and a GPU driver 7, each of which may be one or more software applications or services that execute on CPU 6. GPU 12 may include a graphics 3D processing pipeline 30 that includes a plurality of graphics processing stages that operate together to execute graphics processing commands. GPU 12 may be configured to execute graphics 3D processing pipeline 30 in a variety of rendering modes, including a binning rendering mode and a direct rendering mode. GPU 12 may also be operable to execute a general purpose shader 39 for performing more general computations applicable to be executed by the highly parallel nature of GPU hardware. Such general-purpose applications may be a so-called general-purpose graphics processing unit (GPGPU) and may conform to a general-purpose API, such as OpenCL.

As shown in FIG. 3, graphics 3D processing pipeline 30 may include a command engine 32, a geometry processing stage 34, a rasterization stage 36, and a pixel processing pipeline 38. Each of the components in graphics 3D processing pipeline 30 may be implemented as fixed-function components, programmable components (e.g., as part of a shader program executing on a programmable shader unit), or as a combination of fixed-function and programmable components. Memory available to CPU 6 and GPU 12 may include system memory 10, that may include frame buffer 15. Frame buffer 15 may store rendered image data.

Software application 24 may be any application that utilizes the functionality of GPU 12. For example, software application 24 may be a GUI application, an operating system, a portable mapping application, a computer-aided design program for engineering or artistic applications, a video game application, or another type of software application that uses 2D or 3D graphics. Software application 24 may also be an application that uses the GPU to perform more general calculations, such as in a GPGPU application.

Software application 24 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 24 may invoke GPU driver 7, via graphics API 26, to issue one or more commands to GPU 12 for rendering one or more graphics primitives into displayable graphics images. For example, software application 24 may invoke GPU driver 7, via graphics API 26, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 24 to GPU driver 7, GPU driver 7 may formulate one or more commands that specify one or more operations for GPU 12 to perform in order to render the primitive. When GPU 12 receives a command from CPU 6, graphics 3D processing pipeline 30 decodes the command and configures one or more processing elements within graphics 3D processing pipeline 30 to perform the operation specified in the command. After performing the specified operations, graphics 3D processing pipeline 30 outputs the rendered data to frame buffer 15 associated with a display device. Graphics 3D processing pipeline 30 may be configured to execute in one of a plurality of different rendering modes, including a binning rendering mode and a direct rendering mode.

GPU driver 7 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations. In accordance with some examples of this disclosure, a pixel shader program may also include instructions that selectively cause texture values to be retrieved for source pixels based on corresponding destination alpha values for the source pixels.

Graphics 3D processing pipeline 30 may be configured to receive one or more graphics processing commands from CPU 6, via GPU driver 7, and to execute the graphics processing commands to generate displayable graphics images. As discussed above, graphics 3D processing pipeline 30 includes a plurality of stages that operate together to execute graphics processing commands. It should be noted, however, that such stages need not necessarily be implemented in separate hardware blocks. For example, portions of geometry processing stage 34 and pixel processing pipeline 38 may be implemented as part of a unified shader unit. Again, graphics 3D processing pipeline 30 may be configured to execute in one of a plurality of different rendering modes, including a binning rendering mode and a direct rendering mode.

Command engine 32 may receive graphics processing commands and configure the remaining processing stages within graphics 3D processing pipeline 30 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates. Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics 3D processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Rasterization stage 36 is configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive. Rasterization stage 36 may determine which screen pixel locations are covered by a primitive by using techniques known to those of skill in the art, such as, e.g., an edge-walking technique, evaluating edge equations, etc. Rasterization stage 36 may provide the resulting source pixels to pixel processing pipeline 38 for further processing.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Pixel processing pipeline 38 is configured to receive a source pixel associated with a rasterized primitive, and to perform one or more per-pixel operations on the source pixel. Per-pixel operations that may be performed by pixel processing pipeline 38 include, e.g., alpha test, texture mapping, color computation, pixel shading, per-pixel lighting, fog processing, blending, a pixel ownership text, a source alpha test, a stencil test, a depth test, a scissors test and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in frame buffer 15. The destination pixel data may be associated with a destination pixel in frame buffer 15 that has the same display location as the source pixel that was processed. The destination pixel data may include data such as, e.g., color values, destination alpha values, depth values, etc.

Frame buffer 15 stores destination pixels for GPU 12. Each destination pixel may be associated with a unique screen pixel location. In some examples, frame buffer 15 may store color components and a destination alpha value for each destination pixel. For example, frame buffer 15 may store Red, Green, Blue, Alpha (RGBA) components for each pixel where the "RGB" components correspond to color values and the "A" component corresponds to a destination alpha value. Pixel values may also be represented by a luma component (Y) and one or more chroma components (e.g., U and V). Although frame buffer 15 and system memory 10 are illustrated as being separate memory units, in other examples, frame buffer 15 may be part of system memory 10.

General purpose shader 39 may be any application executable on GPU 12 to perform calculations. Typically, such calculations are of the type that takes advantage of the highly parallel structure of GPU processing cores, including arithmetic logic units (ALUs). An example general purpose shader 39 may conform to the OpenCL API. OpenCL is an API that allows an application to have access across multiple processors in a heterogeneous system (e.g., a system including a CPU, GPU, DSP, etc.). Typically, in an OpenCL conforming application, GPU 12 would be used to perform non-graphical computing. Examples of non-graphical computing applications may include physics-based simulations, fast Fourier transforms, audio signal processing, digital image processing, video processing, image post filtering, computational camera, climate research, weather forecasting, neural networks, cryptography, and massively parallel data crunching, among many others.

Figure 4:
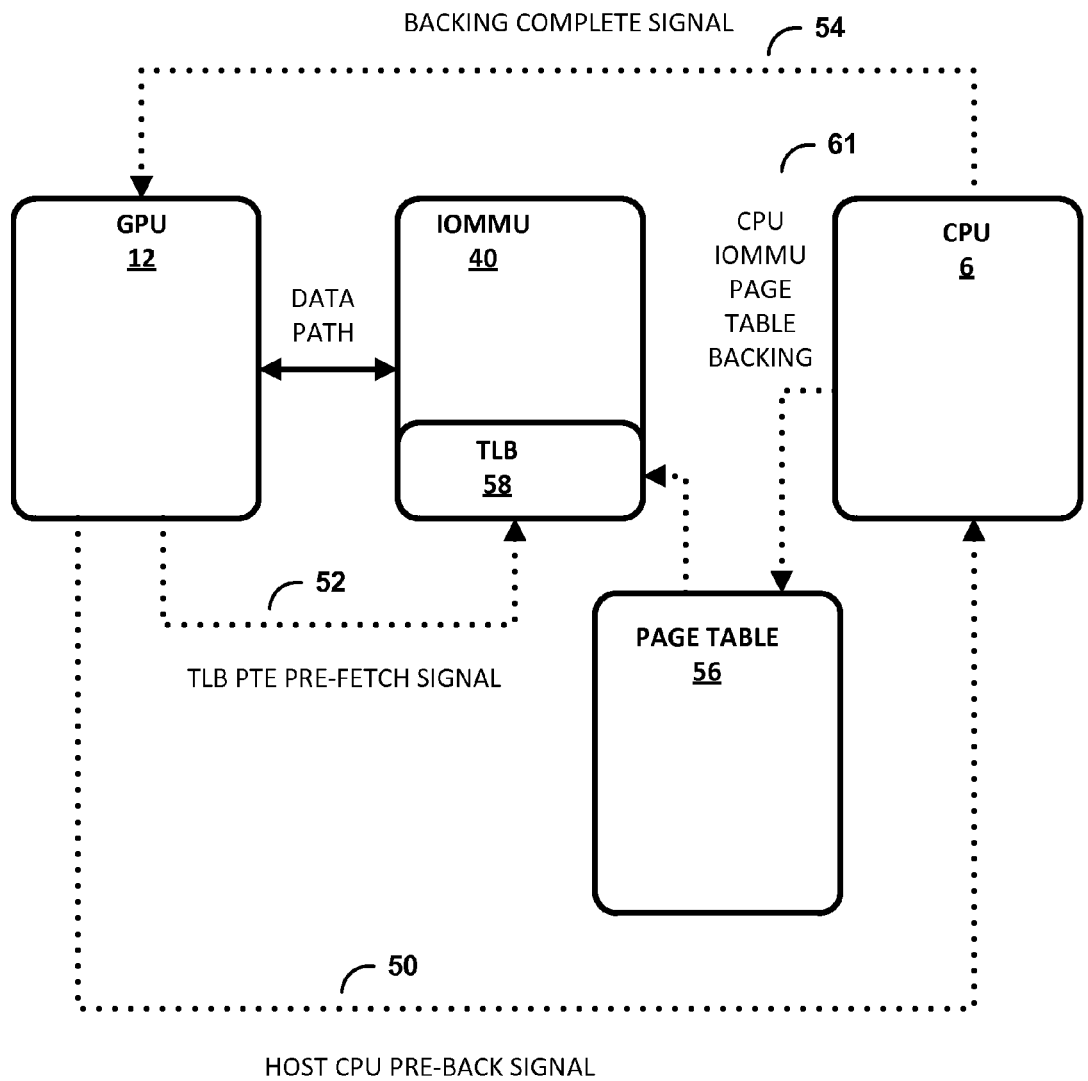
FIG. 4 is a block diagram showing an example apparatus for pre-fetch and pre-back signaling in accordance with the techniques of this disclosure.

FIG. 4 is a block diagram showing an example apparatus for pre-fetch and pre-back signaling in accordance with techniques of this disclosure. FIG. 4 is described with reference to GPU 12, but the techniques of this disclosure are applicable for use with an input/output device. Example input/output devices include digital signal processors, video encoder/decoders, display controller, audio processors, camera processor, image processor, network device, or any other type of processing core that steps through memory in a generally linear fashion.

This disclosure proposes techniques for demand paging for an IO device (e.g., a GPU). In particular, the techniques of this disclosure add pre-fetch and pre-back notification event signaling to reduce latency associated with demand paging. The signaling is used to avoid the bulk of the page faults by informing the OS/CPU of upcoming accesses to unmapped memory.

The techniques of the disclosure include the use of pre-back and/or pre-fetch signaling to anticipate and possibly prevent both page faults and TLB misses in a demand paging virtual memory system for an IO device. A pre-back signal may be used to inform an OS or a CPU that unmapped pages (i.e., pages of virtual memory that are not currently backed in physical memory) are about to be accessed by an IO device. In response to such a signal, the CPU and/or OS may back the anticipated pages into physical memory in attempt to have such pages backed before they are accessed by the IO device. In some use cases, such a pre-back signal may avoid the majority of page faults and their resultant latency drawbacks.

With reference to FIG. 4, GPU 12 may send a host CPU pre-back signal 50 to CPU 6 to request that additional pages be backed into physical memory. GPU 12 may send pre-back signal 50 in response to a determination that usage of currently backed pages has exceeded some predetermined threshold of buffer usage. In essence, by tracking usage of currently backed pages, GPU 12 is anticipating that currently unbacked pages will be needed in the near future. Additional details of usage tracking and thresholds will be discussed with reference to FIG. 5 below.

In response to pre-back signal 50, CPU 6 may back additional pages in page table 56 into physical memory (CPU IOMMU page table backing 61). That is, additional pages of virtual memory in page table 56 are mapped to physical memory locations (e.g., system memory 10 of FIG. 1). Page table 56 stores the mapping between virtual memory addresses and physical memory. When backing is completed, CPU 6 may signal a backing complete signal 54 to GPU 12 to inform a GPU. Backing complete signal 54 may inform GPU 12 that suspension of any operations is not necessary since a page fault was avoided due to the pre-backing operation. In other cases, when pre-backing was unable to be performed in time to prevent a page fault, backing complete signal 54 may be used to inform GPU 12 that any suspended operations may be restarted.

On a related topic, even buffers that contain pages that are backed in physical memory can suffer performance impacts in a virtualized memory system provided by an IOMMU. Specifically, the IOMMU typically contain small caches (TLBs) to hold portions of the translation page table. This is to avoid fetching translation page table entries (PTE) from memory (e.g., DRAM) for every translation. Heavy missing on the TLB cache (i.e., a TLB miss) can lead to significant performance loss because the data operations of the IO device get stalled behind PTE fetches to memory. As such, this disclosure proposes a pre-fetch signal that is used to inform an IOMMU that page table entries (PTE) that are not currently stored in the TLB will be accessed soon. In response to the pre-fetch signal, an IOMMU may access PTEs for the anticipated pages in attempt to have PTEs for such pages stored in the TLB before they are accessed by the IO device. In some use cases, such a pre-fetch signal may avoid the majority of TLB misses and their resultant latency drawbacks.

With reference to FIG. 4, GPU 12 may send a TLB PTE pre-fetch signal 52 to IOMMU 40 to request that PTEs be loaded into TLB 58. GPU 12 may send pre-fetch signal 52 in response to a determination that usage of a mapped page with a TLB PTE has exceeded some predetermined threshold. In essence, by tracking usage of page with TLB PTEs, GPU 12 is anticipating that PTEs for other pages will be needed in the near future in TLB 58 of IOMMU 40. In response to pre-fetch signal 52, IOMMU 40 may fetch and store PTEs relating to additional mapped pages from memory (e.g., system memory 10 or from DRAM). Additional details of usage tracking and thresholds for page PTEs will be discussed with reference to FIG. 6 below.

Figure 5:
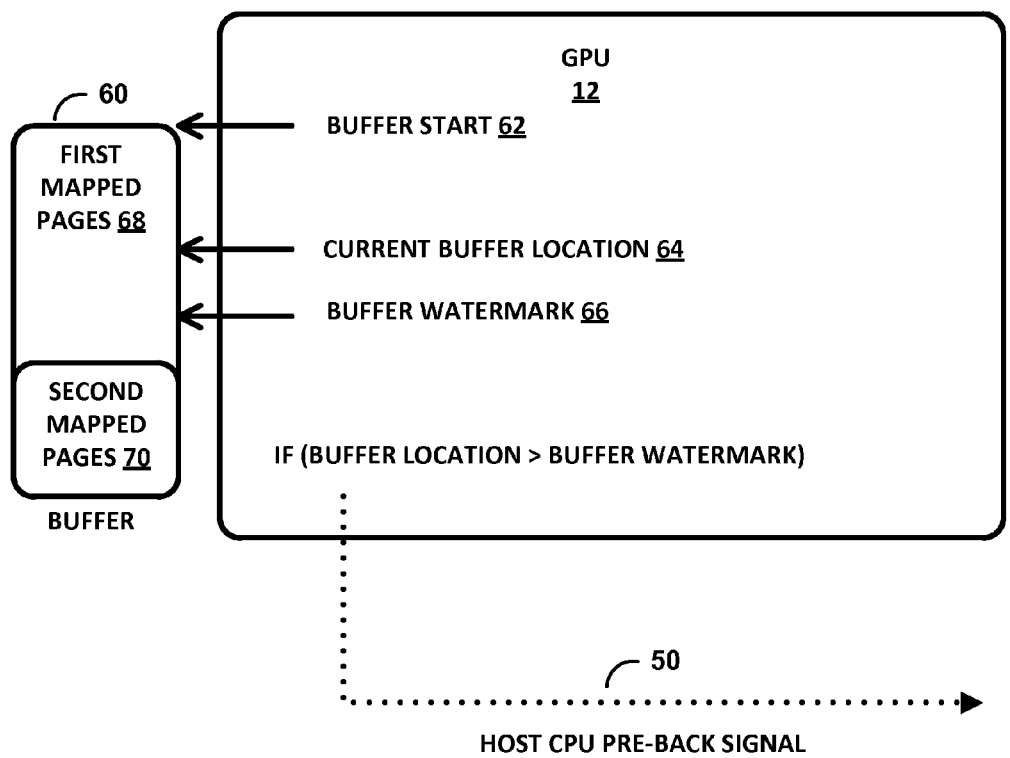
FIG. 5 is a conceptual diagram showing one example of pre-back signal triggering according to one example of the disclosure.

There are a multitude of possible methods and techniques in an IO device (e.g., GPU 12) to generate the pre-back or pre-fetch signaling. FIG. 5 is a conceptual diagram showing one example of pre-back signal triggering according to one example of the disclosure. In the example of FIG. 5, GPU 12 tracks the usage of memory accesses to buffer 60. The usage may be both reads and writes to buffer 60. Buffer 60 may store one or more mapped pages of virtual memory. In many cases only a portion of the total number of pages in a buffer may be backed in physical memory. For example, a first portion of mapped pages in buffer 60 (e.g., first mapped pages 68) may be backed into physical memory, while a second portion of mapped pages (e.g., second mapped pages 70) may not yet be backed in physical memory. Buffer start 62 indicates the first memory address in the contiguous address entries of the mapped pages stored in buffer 62.

GPU 12 is configured to track the current location of buffer access (current buffer location 64) against some threshold (buffer watermark 66). Buffer watermark 66 indicates a specific virtual memory address for a page stored in buffer 60. In one example, the host CPU pre-back signal 50 may be triggered when current buffer location 64 is past buffer watermark 66. That is, pre-back signal 50 is triggered once GPU 12 accesses virtual memory locations with a higher address than buffer watermark 66. In response to pre-back signal 50, CPU 6 would then back second mapped pages 70 into physical memory.

The above technique for pre-back signaling may be particularly applicable for applications where buffer 60 is accessed in a highly linear fashion. Examples of buffers that are accessed in a highly linear fashion include command stream buffers, vertex buffers, instruction stream buffers, texture buffers, meta-data flow buffers, compute buffers, and intermediate stage flow buffers. Command buffers contain the command stream between the driver (producer) and GPU (consumer). The command stream may be a stream of jobs or sub jobs (register writes for example). Vertex buffers contain the geometry information the GPU uses to draw with, such as position, color, texture coordinates and other attribute data. Instruction stream buffers contain the instruction or program which the GPU shader/compute units run, such as vertex, pixel or compute shaders. Texture Buffers contain texture image data. Intermediate stage flow buffers handle data flow for a job. Often times the GPU will have limited internal memory to handle the data flow for a job, in which case, the GPU will stream or dump the data flow to an intermediate stage buffer (or other dedicated graphics or system memory) and a subsequent GPU stage will consume back from that memory. Also would be worth mentioning two other buffer types. Meta-data flow buffers contain inter-state data created by the GPU explicitly. An example of such explicitly created inter-state data would be a deferred renderer that consumes vertex data and outputs a visibility stream for a subsequent stage to use. Compute buffers are used to store general purpose data computed by a GPU. Modern GPUs are designed to support generic computational tasks that are not graphics specific. In this case buffers, such as a compute buffer, can represent arbitrary data structures (array of lists or list of arrays for example). It should be noted that the buffer watermark triggering technique may be applied to multiple bound buffer streams bound to an IO device.

Figure 6:
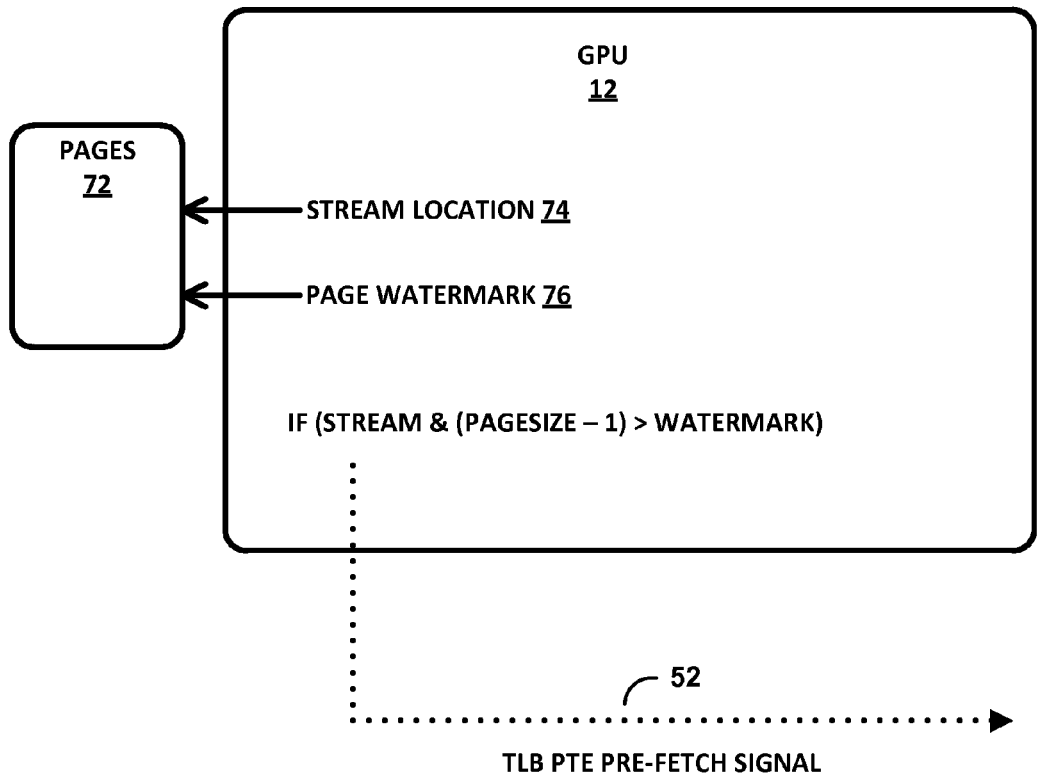
FIG. 6 is a conceptual diagram showing one example of pre-fetch signal triggering according to one example of the disclosure.

FIG. 6 is a conceptual diagram showing one example of pre-fetch signal triggering according to one example of the disclosure. In the example of FIG. 6, GPU 12 tracks the usage of memory accesses to pages 72. The usage may be both reads and writes to buffer 60. Pages 72 may include one or more mapped pages of virtual memory. In many cases only a portion of the total number of pages 72 may have corresponding PTEs stored in TLB 58 of IOMMU 40 (see FIG. 4). For example, a first portion of mapped pages page 72 may have corresponding PTEs stored in IOMMU 40, while a second portion of mapped pages 72 may not have any PTEs stored in IOMMU 40.

GPU 12 is configured to track the usage of memory addresses in pages 72 against some threshold (e.g., page watermark 76). Page watermark 76 indicates a specific virtual memory address for a page stored in pages 72. In one example, GPU 12 may be configured to track the current location of virtual memory for a command stream (stream location 74). The host TLB PTE pre-fetch signal 52 may be triggered when stream location 74 is past page watermark 76. That is, pre-fetch signal 52 is triggered once GPU 12 accesses virtual memory locations with a higher address than page watermark 76. In response to pre-fetch signal 52, IOMMU 40 would then fetch PTEs related to subsequent pages in page 72. The instruction "IF (STREAM & (PAGESIZE−1)>WATERMARK)" causes a pre-fetch signal every time the stream approached a 4 KB boundary (i.e., PAGESIZE) of the next page. This instruction would do accomplish that. For example, every time the stream got close (defined by WATERMARK) to the next page boundary it would send a pre-fetch signal. In one example, pre-fetch signaling may be triggered in response to a GPU 12 accessing virtual memory location close to a page boundary. In examples where multiple pages are contained in pages 72, page watermark 76 may be positioned before the page boundary for a last page having PTEs in TLB 58 of IOMMU 40.

The above technique for pre-fetch signaling may also be particularly applicable for applications where pages 72 are accessed in a highly linear or sequential fashion. Like pre-back signaling, examples of pages that are accessed in a highly linear fashion may include pages in command stream buffers, vertex buffers, instruction stream buffers, texture buffers, and intermediate stage flow buffers.

CPU 6 may be configured to provide pre-fetch and pre-back triggers to GPU 12, either implicitly or explicitly, before GPU 12 launches memory transactions to memory buffers, including both read and write transactions. The pre-fetch and pre-back triggers may be signaled to the GPU 12 either through an application executing at CPU 6 or through a device driver (e.g., GPU driver 7 of FIG. 1).

When a new buffer is bound for GPU 12 (e.g., a vertex, texture or command buffer), it is likely that such a buffer will be accessed by the subsequent job. In this case, the binding of the buffer can be paired with a signaling trigger for GPU 12 to utilize the pre-fetch and pre-back signals. There are other scenarios where both the GPU driver 7 and/or an application executing on CPU 6 may determine a general access pattern for a subsequent job (e.g., a highly linear buffer access pattern or a spatially deterministic access pattern). In these cases, a pre-fetch/pre-back execution command can be put into the command stream for execution on GPU 12 prior to a memory access job.

An 10 device, such as a GPU 12, may contain stream processors that run highly parallelized jobs. Instruction programs that execute on the stream processors can be extended to include pre-fetch and pre-back trigger instructions. For example, as shown in FIG. 3, graphics 3D processing pipeline 30, including a shader subsystem and/or other pipeline blocks, executing on GPU 12 may be configured to track the thresholds provided by CPU 6. This would allow any known access patterns that could be determined at program development or compile time to be expressed as pre-back and pre-fetch triggers.

The techniques of this disclosure may also be extended to the unmapping of virtual memory pages no longer in use. As GPU 12 completes the use of mapped pages, the same type of signaling can be used to instruct CPU 6 to free (e.g., unmap) the virtual memory pages that are no longer needed.

The buffer and page watermarking techniques described above may also be used for other situations where buffer and/or page access is not highly linear. In particular, many GPU applications are spatially deterministic. That is, when an application is launched on the GPU, it is known in what spatial order pixels will be drawn on the screen. Examples of GPU applications that are often spatially deterministic include rasterization. While rasterization in a GPU is not always spatially deterministic, there are many cases that are. For example, large block transfers (BLTs) and tiled renderer resolve to DRAM occurs in a spatial pattern known a prioi to launching such a job. A BLT is an instruction that copies data from one memory to another. BLTs of pixel data are often executed when a GPU is instructed to draw a particular area of a scene.

In these cases an extended method of the simple linear watermarks described with reference to FIG. 5 and FIG. 6 could be used to trigger a pre-back signal and/or pre-fetch signal. For example, the raster pattern in x, y space may occur in a known pattern across a given screen space region. As the raster walks, GPU 12 may be configured to trigger a pre-back and/or pre-fetch signals for regions in the raster scan that will be accessed in the future. In particular, a watermark may be placed at a location(s) in the raster scan pattern near locations where subsequent entries in the raster scan pattern are not currently packed in physical memory. Likewise, a watermark may be placed at a location(s) in the raster scan pattern near locations where subsequent entries in the raster scan pattern do not have PTEs currently stored in a TLB.

Other techniques may also be used to track and/or estimate the usage of memory and to generate the pre-back and pre-fetch signaling described in this disclosure. One such example includes utilizing a second rasterizer that "runs ahead" of the normal rasterizer (e.g., rasterization stage 36 of FIG. 3). The second rasterizer could be a coarse-grained rasterizer. That is, the second rasterizer may perform rasterization at a lower level of resolution and less precision, as the goal of this rasterizer is not to produce pixels for display, but to determine what future memory usage warrants a pre-fetch or pre-back signal. As one example, the second rasterizer may operate a number of pixels (e.g., 100 pixels) in front of the normal rasterizer. However, any number of "run-ahead" pixels may be used that allows for useful pre-back and pre-fetch signaling.

In general, any "run-ahead" techniques using sparse element execution could be used to track memory usage and trigger pre-back and pre-fetch signaling. Sparse element execution generally means that only a portion of jobs (e.g., pixels or work items) of a total number of jobs are executed at a time. As one example, for a drawcall made up of 1000's of vertices, the run-ahead engine could fully execute a vertex 20 ahead of the current vertex. Again, any number of run-ahead vertices may be used that allows for pre-fetch and/or pre-back signaling to be useful for the particular application. The run-ahead engine may be a parallel processing pipeline that is identical or nearly identical to the pipeline producing compute jobs or pixels for display. In another example, the same engine used for producing compute jobs or pixels for display may be paused to execute a "run-ahead" job to determine pre-back or pre-fetch signaling. After the "run-ahead" job is completed, the main job may be resumed. As with the run-ahead rasterizer example above, the goal of the run-ahead engine is not to produce accurate compute job results or pixels for display, but rather to determine what future memory usage warrants a pre-fetch or pre-back signal.

Note that for OpenCL applications, the run-ahead engine may operate on a work item that is 1000 work items in front of the current work item. For typical OpenCL applications, a work item is effectively equivalent to a pixel. The GPU does not treat a work item as an x, y position per se (like a pixel), but rather, a work item belongs to an x, y, z grid of work items, called a work group. In effect, a work group is somewhat equivalent to a triangle in 3D graphics processing.

Another technique for tracking future memory usage to determine when to send a pre-fetch or pre-back signal may involve using the "front end" of a GPU pipeline to look ahead to future commands. Typically, GPU pipelines will include some sort of command processor at the beginning of the pipeline to process a command stream that includes jobs for later stages of the pipeline. An example command processor may be command engine 32 of graphics 3D processing pipeline 30 of FIG. 3. However, this technique is not limited to 3D graphics applications, but to any type of application (OpenCL, application, video encoding and decoding, image processing etc.) that may use a command processor. The command processor may be configured to evaluate a command stream to determine when to send a pre-back or pre-fetch signal.

GPU command streams, for 3D graphics processing, for example, generally contain commands that set some register or issue some rendering action. Usually there exists an adequate number of registers that hold memory addresses (or a range thereof) from which data will be fetched or to which data will be written. Rendering commands often hold memory addresses of buffers that the GPU will access. When processing command streams, the command processor (e.g., the command engine 32) of the GPU may be configured to scan the command stream for memory addresses, create a list of mapped pages that will be accessed soon, and use such a list to trigger a pre-back/pre-fetch signal. More specifically, the command engine would be configured to determine the need for future unmapped pages before later stages in the pipeline (e.g., geometry processing stage 34, rasterization stage 36, pixel processing pipeline 38) need to access such unmapped pages.

Figure 7:
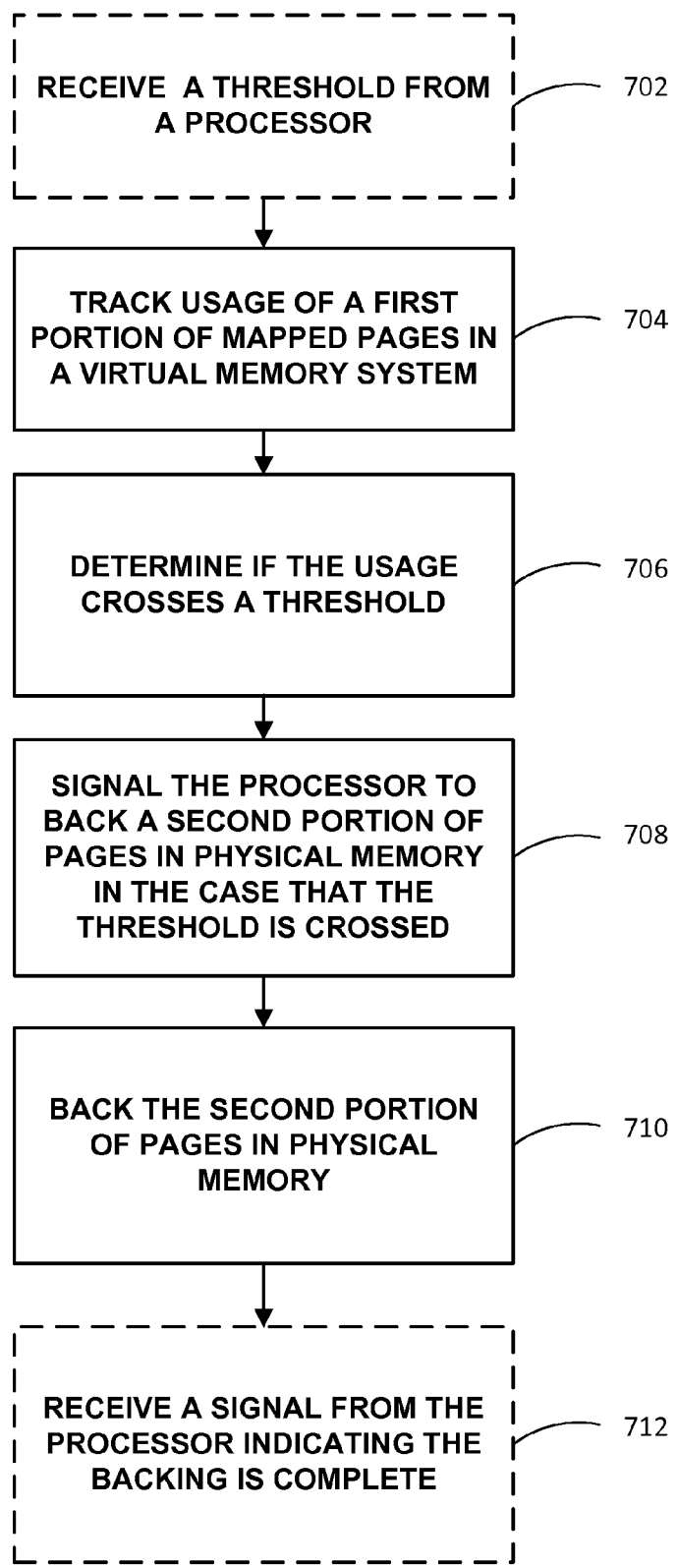
FIG. 7 is a flowchart for executing a method according to one example of the disclosure.

FIG. 7 shows a flowchart for executing a method for pre-back signaling according to one example of the disclosure. The methods shown in FIG. 7 may be performed by CPU 6 and GPU 12 of FIG. 1. GPU 12 may be configured to track a usage of a first portion of mapped pages in a virtual memory system by an application executing on GPU 12 (704). The first portion of mapped pages represents a portion of a number of pages that may be needed by the application, and the first portion of mapped pages are backed into physical memory.

GPU 12 may be further configured to determine if the usage crosses a threshold (706). The threshold may be implicitly determined by the GPU 12 or may be optionally received from CPU 6 (702). In some examples, the threshold is a watermark representing a percentage of usage of the first portion of mapped pages. In this example, at least the first portion of mapped pages is stored in a buffer, and the watermark is a location within the buffer. In this case, GPU 12 may be further configured to determine if a current location accessed in the buffer is past the watermark. The buffer may be one of a command stream buffer, a vertex buffer, a texture buffer, an instruction stream buffer, a rasterization buffer, and an intermediate stage flow buffer. In another example, the buffer is the rasterization buffer and the application executing on the GPU is one of a block transfer (BLT) and a tiled renderer resolve.

In the case that the threshold is determined to be crossed, GPU 12 may be further configured to signal CPU 6 to back a second portion of pages in physical memory (708) (i.e., translate virtual memory address to physical memory addresses). The second portion of pages represents a different portion of the number of pages that may be needed by the application. In response to the signal, CPU 6 may be configured to back the second portion of pages to physical memory (710). Optionally, GPU 12 may be further configured to receive a signal from CPU 6 indicating that the backing is complete (712).

Figure 8:
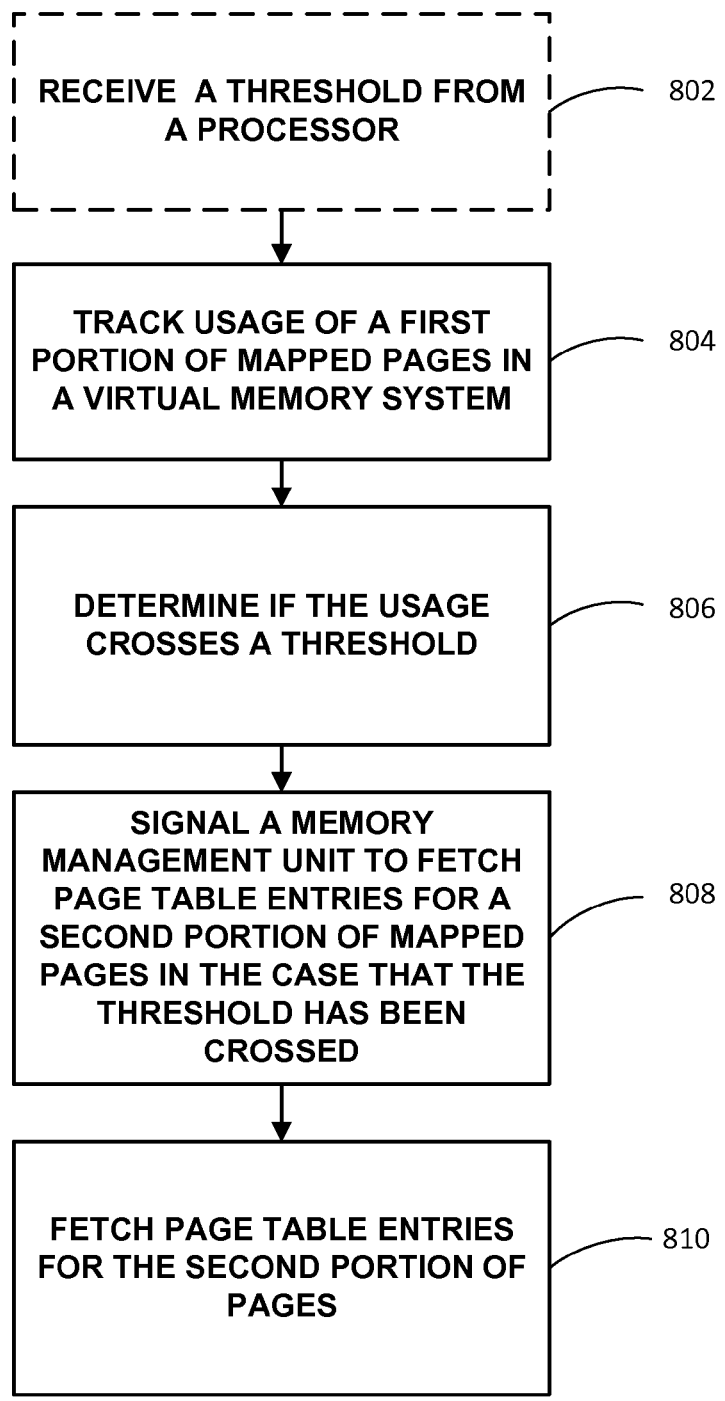
FIG. 8 is a flowchart for executing a method according to another example of the disclosure.

FIG. 8 shows a flowchart for executing a method for pre-fetch signaling according to another example of the disclosure. The methods shown in FIG. 7 may be performed by CPU 6, memory controllers 8 and GPU 12 of FIG. 1. In particular, memory controllers 8 may be IOMMU 40 of FIG. 4. GPU 12 may be configured to track a usage of a first portion of mapped pages in a virtual memory system by an application executing on GPU 12 (804). The first portion of mapped pages represents a portion of a number of pages that may be needed by the application. Page table entries for the first portion of mapped pages are stored in IOMMU 40 (e.g., in TLB 58).

GPU 12 may be further configured to determine if the usage crosses a threshold (806). In this context, crossing a threshold may include exceeding or falling below a certain threshold value. The threshold may be implicitly determined by the GPU 12 or may be optionally received from CPU 6 (802). In some examples, the threshold is a watermark representing a percentage of usage of the first portion of mapped pages. In one example, the watermark is a location within a last page of the first portion of mapped pages. In this case, GPU 12 is further configured to determine if a current location accessed in the last page is past the watermark.

In the case that the threshold is determined to be crossed, GPU 12 may be configured to signal IOMMU 40 to fetch page table entries for a second portion of mapped pages (808). The second portion of pages represents a different portion of the number of pages that may be needed by the application. In response to the signal, IOMMU 40 may be configured to fetch page table entries for the second portion of pages (810).

In one or more examples, the functions described above may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for demand paging in an input/output device, the method comprising:
    tracking, by the input/output device, a usage of a first portion of mapped pages in a virtual memory system by an application executing on the input/output device, wherein at least the first portion of mapped pages is stored in a buffer, wherein the usage comprises a number of reads and writes to the buffer storing the first portion of mapped pages, and wherein the first portion of mapped pages represents a portion of a number of pages associated with the application, and wherein the first portion of mapped pages are backed into physical memory by a processor;
    determining, by the input/output device, if a current location accessed in the buffer by the input/output device has crossed a watermark, wherein the watermark is a location within the buffer representing a percentage of usage of the first portion of mapped pages; and
    in response to a determination that the current location accessed in the buffer by the input/output device has crossed the watermark, and without receiving a page fault, signaling the processor to back a second portion of mapped pages in physical memory, wherein the second portion of mapped pages represents a different portion of the number of pages associated with the application.

2. The method of claim 1, further comprising:
backing, by the processor, the second portion of mapped pages to physical memory.

3. The method of claim 2, further comprising:
receiving, at the input/output device, a signal from the processor indicating that the backing of the second portion of mapped pages is complete.

4. The method of claim 1, wherein the buffer is one of a command stream buffer, a vertex buffer, a texture buffer, an instruction stream buffer, a rasterization buffer, and an intermediate stage flow buffer.

5. The method of claim 4, wherein the buffer is the rasterization buffer and wherein the application is one of a block transfer (BLT) and a tiled renderer resolve.

6. The method of claim 1, further comprising:
receiving the watermark from the processor.

7. The method of claim 1, wherein the input/output device is a graphics processing unit.

8. The method of claim 1, wherein the processor is a central processing unit.

9. An apparatus configured to perform demand paging for an input/output device comprising:
an input/output device configured to:
track a usage of a first portion of mapped pages in a virtual memory system by an application executing on the input/output device, wherein at least the first portion of mapped pages is stored in a buffer, wherein the usage comprises a number of reads and writes to the buffer storing the first portion of mapped pages, and wherein the first portion of mapped pages represents a portion of a number of pages associated with the application, and wherein the first portion of mapped pages are backed into physical memory by a processor;
determine if a current location accessed in the buffer by the input/output device has crossed a watermark, wherein the watermark is a location within the buffer representing a percentage of usage of the first portion of mapped pages; and
in response to a determination that the current location accessed in the buffer by the input/output device has crossed the watermark, and without receiving a page fault, signal the processor to back a second portion of mapped pages in physical memory, wherein the second portion of mapped pages represents a different portion of the number of pages associated with the application.

10. The apparatus of claim 9, further comprising:
the processor, wherein the processor is configured to back the second portion of mapped pages to physical memory.

11. The apparatus of claim 10, wherein the input/output device is further configured to:
receive a signal from the processor indicating that the backing of the second portion of mapped pages is complete.

12. The apparatus of claim 9, wherein the buffer is one of a command stream buffer, a vertex buffer, a texture buffer, an instruction stream buffer, a rasterization buffer, and an intermediate stage flow buffer.

13. The apparatus of claim 12, wherein the buffer is the rasterization buffer and wherein the application is one of a block transfer (BLT) and a tiled renderer resolve.

14. The apparatus of claim 9, wherein the input/output device is further configured to:
receive the watermark from the processor.

15. The apparatus of claim 9, wherein the input/output device is a graphics processing unit.

16. The apparatus of claim 9, wherein the processor is a central processing unit.

17. The apparatus of claim 9, wherein the input/output device and the processor are housed within a mobile device.

18. An apparatus configured to perform demand paging for an input/output device comprising:
means for tracking a usage of a first portion of mapped pages in a virtual memory system by an application executing on the input/output device, wherein at least the first portion of mapped pages is stored in a buffer, wherein the usage comprises a number of reads and writes to the buffer storing the first portion of mapped pages, and wherein the first portion of mapped pages represents a portion of a number of pages associated with the application, and wherein the first portion of mapped pages are backed into physical memory by a processor;
means for determining if a current location accessed in the buffer by the input/output device has crossed a watermark, wherein the watermark is a location within the buffer representing a percentage of usage of the first portion of mapped pages; and
means for signaling the processor to back a second portion of mapped pages in physical memory in response to a determination the current location accessed in the buffer by the input/output device has crossed the watermark, and without receiving a page fault, wherein the second portion of mapped pages represents a different portion of the number of pages associated with the application.

19. A non-transitory computer-readable storage medium storing instructions that, when executed, causes one or more processors configured to perform demand paging for an input/output device to:
track a usage of a first portion of mapped pages in a virtual memory system by an application executing on the input/output device, wherein at least the first portion of mapped pages is stored in a buffer, wherein the usage comprises a number of reads and writes to the buffer storing the first portion of mapped pages, and wherein the first portion of mapped pages represents a portion of a number of pages associated with the application, and wherein the first portion of mapped pages are backed into physical memory by a processor;
determine if a current location accessed in the buffer by the input/output device has crossed a watermark, wherein the watermark is a location within the buffer representing a percentage of usage of the first portion of mapped pages; and
in response to a determination that the current location accessed in the buffer by the input/output device has crossed the watermark, and without receiving a page fault, signal the processor to back a second portion of mapped pages in physical memory, wherein the second portion of mapped pages represents a different portion of the number of pages associated with the application.

20. A method for demand paging in an input/output device comprising:
tracking, by the input/output device, a currently accessed location in a page table of a first portion of mapped pages in a virtual memory system by an application executing on the input/output device, the page table mapping the first portion of mapped pages, and wherein the first portion of mapped pages represents a portion of a number of pages associated with the application, wherein page table entries for the first portion of mapped pages are stored in a memory management unit;

determining, by the input/output device, if the currently accessed location accessed in a last page of the page table by the input/output device has crossed a watermark; and in response to a determination that the currently accessed location accessed in the last page of the page table by the input/output device has crossed the watermark, and without receiving a translation lookaside buffer (TLB) miss, signaling the memory management unit to fetch page table entries for a second portion of mapped pages, wherein the second portion of mapped pages represents a different portion of the number of pages associated with the application.

21. The method of claim 20, further comprising:
fetching, by the memory management unit, page table entries for the second portion of mapped pages.

22. The method of claim 20, further comprising:
receiving the watermark from a processor.

23. The method of claim 20, wherein the input/output device is a graphics processing unit.

24. The method of claim 20, wherein the memory management unit is an input/output memory management unit.

25. An apparatus configured to perform demand paging for an input/output device comprising:
an input/output device configured to:
track a currently accessed location in a page table of a first portion of mapped pages in a virtual memory system by an application executing on the input/output device, the page table mapping the first portion of mapped pages, wherein the first portion of mapped pages represents a portion of a number of pages associated with the application, wherein page table entries for the first portion of mapped pages are stored in a memory management unit;
determine if the currently accessed location accessed in a last page of the page table by the input/output device has crossed a watermark; and
in response to a determination that currently accessed location accessed in the last page of the page table by the input/output device has crossed the watermark, and without receiving a translation lookaside buffer (TLB) miss, signal the memory management unit to fetch page table entries for a second portion of mapped pages, wherein the second portion of mapped pages represents a different portion of the number of pages associated with the application.

26. The apparatus of claim 25, further comprising:
the memory management unit, wherein the memory management unit is configured to:
fetch page table entries for the second portion of mapped pages.

27. The apparatus of claim 25, wherein the input/output device is further configured to:
receive the watermark from a processor.

28. The apparatus of claim 25, wherein the input/output device is a graphics processing unit.

29. The apparatus of claim 25, wherein the memory management unit is an input/output memory management unit.

30. The apparatus of claim 25, wherein the input/output device and the memory management unit are housed within a mobile device.

31. An apparatus configured to perform demand paging for an input/output device comprising:
means for tracking a currently accessed location in a page table of a first portion of mapped pages in a virtual memory system by an application executing on the input/output device, the page table mapping the first portion of mapped pages, wherein the first portion of mapped pages represents a portion of a number of pages associated with the application, and wherein page table entries for the first portion of mapped pages are stored in a memory management unit;
means for determining, by the input/output device, if the currently accessed location accessed in a last page of the page table by the input/output device has crossed a watermark; and
means for signaling the memory management unit to fetch page table entries for a second portion of mapped pages in response to a determination that the currently accessed location accessed in the last page of the page table by the input/output device has crossed the watermark, and without receiving a translation lookaside buffer (TLB) miss, wherein the second portion of mapped pages represents a different portion of the number of pages associated with the application.

32. A non-transitory computer-readable storage medium storing instructions that, when executed, causes one or more processors configured to perform demand paging for an input/output device to:
track a currently accessed location of a first portion of mapped pages in a virtual memory system by an application executing on the input/output device, the page table mapping the first portion of mapped pages, wherein the first portion of mapped pages represents a portion of a number of pages associated with the application, and wherein page table entries for the first portion of mapped pages are stored in a memory management unit;
determine if the currently accessed location accessed in a last page of the page table by the input/output device has crossed a watermark; and
in response to a determination that the currently accessed location accessed in the last page of the page table by the input/output device has crossed the watermark, signal the memory management unit to fetch page table entries for a second portion of mapped pages, and without receiving a translation lookaside buffer (TLB) miss, wherein the second portion of mapped pages represents a different portion of the number of pages associated with the application.

* * * * *